J. A. COLE.
PIPE-COUPLING.
No. 170,058.  Patented Nov. 16, 1875.
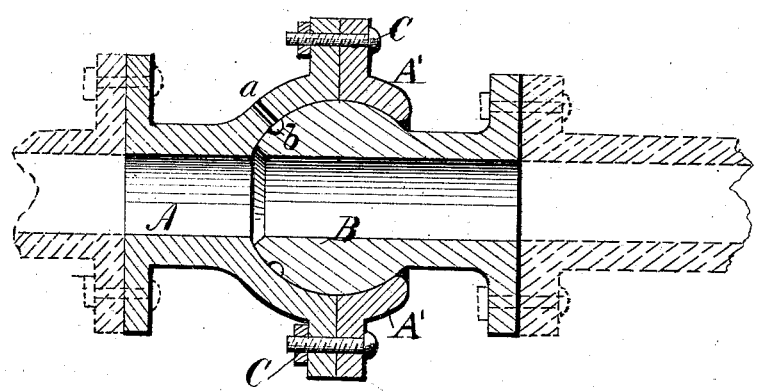
WITNESSES
Franck L. Durand
Philip Mc Mickle
INVENTOR
John A. Cole.
By L. Deane
Attorney

UNITED STATES PATENT OFFICE.

JOHN A. COLE, OF CHICAGO, ILLINOIS.

IMPROVEMENT IN PIPE-COUPLINGS.

Specification forming part of Letters Patent No. 170,058, dated November 16, 1875; application filed September 22, 1875.

*To all whom it may concern:*

Be it known that I, JOHN A. COLE, of Chicago, in the county of Cook and State of Illinois, have invented certain new and useful Improvements in Pipe-Couplings; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The drawing represents in longitudinal section a ball-and-socket joint embodying my invention, which is designed to afford a secure and safe packing for such a joint, and one that can be cheaply made, readily applied, and is not likely to get out of order from any cause; and the said invention consists more particularly in providing a groove on the outer face or surface of the ball or inner portion of the said joint, in which may be fitted or poured packing of any soft metal, all as will now be more particularly set out and explained.

In the drawings, A A' denote the socket or outer part of the joint, the several portions of which are united and held together at their flanges by bolts C, or in any like and ordinary way. B is the ball or inner part of the joint. This may have a bore of equal diameter with the bore of the pipe, which connects at either end of the said joint, or it may be concave to correspond with its outer surface. At any suitable point upon the outer surface of B is a groove or recess, *b*, of sufficient depth and suitable shape to receive and hold a packing of lead or any other soft metal. By this means a tight joint can be made, which, without in any degree interfering with the use or working of this joint, will serve to make it effectually close and impenetrable by water or fluid. It can be applied before the several parts are placed together, or by means of a hole through the socket part at any suitable place corresponding with the position of the groove on the ball, and now shown at *a;* the said packing can be poured or run in after the parts have been placed together. The method of doing this and of closing the said aperture afterward will readily be understood by any mechanic and need not be explained here.

It will make no difference in the use of my device whether constructed in the one or the other of the ways above described.

The advantages of this method of construction are that it obviates all necessity of turning or grinding the several parts, in order to make the joint tight and secure, and it can be made and put in order in the easiest and quickest manner.

The pipe-connections can be made at the flange ends on each pipe, or in any ordinary or usual manner.

My device is designed for use in connecting the sections of permanent water-pipes laid upon the bed of a river or lake, or for connecting any gas or water or pipes where it is desired, for any reason, to have a flexible joint.

Having thus described my invention, what I consider new, and desire to secure by Letters Patent, is—

The combination of ball B, having groove *b* with socket A A', constructed as described, and provided with aperture *a*, substantially as and for the purposes described.

In testimony that I claim the foregoing as my own I affix my signature in the presence of two witnesses.

JOHN A. COLE.

Witnesses:
E. F. M. FAEHTZ,
J. F. SUTHERLAND.